United States Patent [19]

Sternal

[11] Patent Number: 5,834,641

[45] Date of Patent: Nov. 10, 1998

[54] DEPTH GAUGE

[76] Inventor: Bernd Sternal,
Willi-Lohmann-Strasse10, D-06507
Gernrode, Germany

[21] Appl. No.: 727,525

[22] PCT Filed: Apr. 1, 1995

[86] PCT No.: PCT/DE95/00450

§ 371 Date: Oct. 20, 1996

§ 102(e) Date: Oct. 20, 1996

[87] PCT Pub. No.: WO95/29382

PCT Pub. Date: Nov. 2, 1995

[30] Foreign Application Priority Data

Apr. 20, 1994 [DE] Germany ........................ 44 13 727.3
Dec. 5, 1994 [DE] Germany ........................ 44 43 209.7

[51] Int. Cl.⁶ ............................................ G01F 23/14
[52] U.S. Cl. ........................... 73/292; 73/300; 374/143;
374/136; 43/4
[58] Field of Search ........................... 33/714, 716, 719;
73/291, 292, 296, 297, 299, 300; 374/142,
143, 136, 137; 43/4, 17, 17.1, 25

[56] References Cited

U.S. PATENT DOCUMENTS

| 331,133 | 11/1885 | Hannay ........................................ 73/300 |
| 1,969,141 | 8/1934 | McDonald ................................ 374/143 |
| 3,187,572 | 6/1965 | Harland ..................................... 374/143 |
| 3,355,949 | 12/1967 | Elwood et al. ............................ 73/300 |
| 3,721,124 | 3/1973 | Franks ....................................... 374/137 |
| 4,854,728 | 8/1989 | Baron et al. ................................ 73/300 |
| 4,877,330 | 10/1989 | Torre ......................................... 374/136 |
| 5,131,165 | 7/1992 | Benson ...................................... 33/719 |
| 5,272,829 | 12/1993 | Roberts et al. ............................... 43/4 |
| 5,351,538 | 10/1994 | McGuire et al. ............................. 43/4 |
| 5,553,940 | 9/1996 | Nishihara ................................... 374/136 |

FOREIGN PATENT DOCUMENTS 2005545 2/1970 Germany .
2230862 10/1990 United Kingdom .

*Primary Examiner*—G. Bradley Bennett
*Attorney, Agent, or Firm*—Karl Hormann

[57] ABSTRACT

The invention relates to a depth gauge for use in angling or sports fishery. The depth of a body of water may be measured therewith from its surface to its bottom, and/or the depth and the size of strata of water of different temperatures for the purpose of offering bait to different species of fish in their preferred environments, for instance at the bottom of a water or at a thermocline stratum. In accordance with the invention, a water-proof housing a temperature sensor, a pressure sensor, a digital evaluation circuit, a display and a program switch are provided within a water-proof housing and electrically interconnected in such a manner, that the measurement value about the depth of the water to its bottom and/or water strata marked by temperature differences of more than 3° Kelvin are processed and stored by the digital evaluation circuit. By means of the program switch, the stored measurement data may be called up and rendered visible in the display. In its construction and configuration the depth gauge is optimally suited for its intended use. It is light and small, and it may be industrially manufactured with little investment.

10 Claims, 1 Drawing Sheet

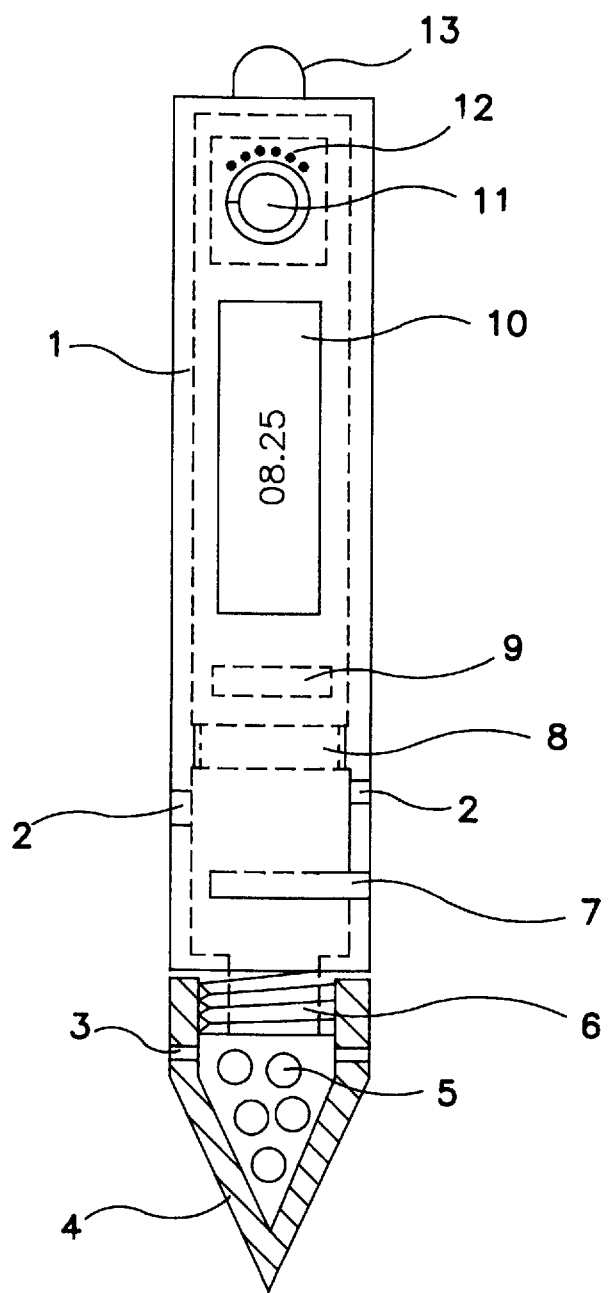

DEPTH GAUGE

BACKGROUND OF THE INVENTION

1. Field of the Invention

The invention relates to a depth gauge for use in angling and sports fishing. It is used to measure the depth of a body of water from its surface to its bottom, or the depth of strata of water of different temperatures within a body of water.

2. The Prior Art

A digital depth gauge with a piezoresistive pressure recording (Druckaufnahme), integral illumination and zero point correction is known for diving in mountain lakes having depths up to 200 m (German patent specification 31 45 158 A1).

Owing to its structure, its size and its weight, as well as, in particular, its elaborate set-up, this apparatus is unsuitable for anglers and sports fishermen.

Also an apparatus is known for detecting the profile of the bottom of waters which in essence consists of a pressure measuring capsule adapted to be moved by a line on the bottom of the water in direct contact therewith, the measured values of which are continuously transmitted to an interpreting station by a connection (German utility model 76 05 605.8). This apparatus is utilized particularly in the preparation of aqueous construction operations and is unsuitable in sports fishery.

For angling and sports fishing, species-specific bait has to be offered to a fish in its respective environment, for which purpose the depth of the water has to be correctly determined by the angler or sports fisherman. At present, this is done by repeatedly sinking and retrieving a ground lead (sinker) on a fishing line and a quill spaced therefrom, and by resetting the distance between sinker and quill until the distance between the bottom of the water and the surface of the water is recognizable by the position of the quill. This is a tedious and time-consuming procedure which because of the frequent casting of the sinker may lead to fish being chased away.

It is known that in almost all bodies of waters there are strata or currents of cold and warm water. At the interfacial zones of such layers of water, i.e. at those positions at which the cold and warm water strata converge, there exist temperature differences of several degrees Kelvin. Such strata are known to anglers and sports fishermen as thermoclines. These thermoclines are of particular importance to the angler or sports fisherman because it is these strata which are often frequented by predatory fish. Therefore, the angler and sports fisherman favors placing his bait as precisely as possible at or in these thermoclines.

Unless the very elaborate procedure for determining these thermoclines is wholly dispensed with and angling is to be undertaken on the basis of "pure luck", this thermocline can only be fathomed with a thermometer. This is done by systematically and frequently placing a thermometer at different depths of the water, and retrieving it for reading, until the approximate depth of the searched-for thermoclines has been determined an the basis of a predetermined discontinuity in temperature.

The use of a known thermometer for this purpose is disadvantageous because of the disproportionately elaborate effort, which is why anglers and sports fishermen usually dispense with determining thermoclines in the waters. In the event, the manipulation of a thermometer for fathoming thermoclines is only possible from a boat, so that from the land the angler has no possibility whatever for detecting thermoclines.

OBJECTS OF THE INVENTION

It is an object of the invention to provide a depth gauge for anglers and sports fishermen which is useful for measuring the depth of a body of water from the surface thereof to its bottom and/or for detecting the depths of layers of water of different temperatures, and which is simple and handy, which delivers reliable measurement values in the range of relatively shallow depths of water, and which may be manufactured with little investment in a cost efficient manner.

SUMMARY OF THE INVENTION

In accordance with the invention the object is accomplished by arranging, within a water-proof housing, at least an electrical pressure sensor, a display including a maximum storage, an electrical battery and a program switch, the pressure sensor being connected to the exterior of the housing unilaterally by at least one pressure compensation aperture or directly, the pressure sensor, battery, program switch and display being electrically interconnected in a conventional manner such that the measurement values of the pressure sensor are rendered visible in the display and remain visible in the display until manually reset by the program switch.

In addition, at least one electrical temperature sensor and one digital evaluation circuit may be arranged within the housing which in a known manner may, if required, be connected to other electronic components such that the measuring values from the temperature sensors may be evaluated by the digital evaluation circuit as the depth gauge is being submerged such that at an occurrence of a temperature discontinuity exceeding 3° Kelvin over a certain distance, the depth of the water at that location is measured and recorded. Also, the measured value is rendered visible in the display where it remains visible until manually reset by the program switch.

In one embodiment of the invention the digital evaluation circuit may be conventionally interconnected with the measuring transducers, pressure sensor and temperature sensor, a measurement value storage, the program switch as well as the display in such a manner that different measured values representing water depth, the depth of the thermocline and its size, the upper and lower temperature of the thermocline as well as temperatures prevailing at different depths can be stored and that these measured values may be rendered visible in the display by manual program switching.

The housing is provided with an eyelet and a bore for attaching a fishing line or a plumb line. The housing may also consist of two threadedly connectable portions, one housing portion being structured as a cavity for receiving ballasts of similar or different weights. For practical purposes, the cavity is provided with apertures for the compensation of pressure.

Alternatively, the ballasts may be structured as parts fitting the housing and may be attached to the exterior of the housing.

The depth gauge in accordance with the invention is optimally structured to accommodate its intended purpose. It is small and light, simple to use and reliable in its performance. The use of such an apparatus reduces the effort involved in preparing for angling and improves the possibility of success and, hence, the enjoyment of leisure time.

The depth gauge may be manufactured in different variants with relatively small investment and at a reasonable ratio of price and performance.

The invention will hereinafter be explained in greater detail. Example 1 relates to measuring of the bottom of a water body and example 2 relates to the measuring of thermoclines.

DESCRIPTION OF THE DRAWING

The drawing is a schematic rendition of the depth gauge in accordance with the invention.

DETAILED DESCRIPTION OF THE INVENTION

Example 1

The depth guage in accordance with the invention is provided with two housing sections 1,4 which are screwed together by threading 6. The housing section 4 is structured as a cavity and is provided with pressure compensation apertures 3.

The housing section 1 contains a pressure sensitive electrical pressure sensor 8, an electric battery 9, a display 10 and a program switch 11.

The pressure sensor 8 seals one side of the housing section 1 unilaterally relative to a chamber provided with pressure compensation apertures 2. An eyelet 13 is arranged on the housing section 1. Pressure sensor 8, battery 9 and display 10 are electrically interconnected in a conventional way and calibrated such that changes in pressure registered by the pressure sensor 8 are rendered visible on a scale in the display 10, and remain visible by virtue of a maximum storage until the indication in the display 10 is manually reset.

For using the depth gauge, it is attached to a fishing line by the eyelet 13. The housing sections 1 and 4 maybe separated, and ballouts 5 are put into the cavity of the housing section 4 as determined by the angler. The housings sections 1 and 4 are then joined again, and the display 10 is set to zero by the program switch 11.

The depth gauge affixed to the fishing line is now sunk to the bottom of the water at the location to be measured, with the water pressure which is proportional to the depth of the water acting on the pressure sensor 8 through the pressure compensation apertures 2, rendering the measured value visible in the display 10 by means of the electric circuitry. By means of the maximum storage the measured value will remain visible in the display 10 until the depth gauge is withdrawn from the water, has been read by the angler and reset by the program switch 11. On the basis of the measured value the relationship between the bait and the quill may now be set precisely and in accordance with the species of fish to be caught.

Example 2

The housing section 1 is threadedly connected to the housing section 4. The housing section 4 is hollow and is provided with pressure compensation apertures 3. It may be charged with ballasts 5.

In the housing, there are provided an electrical pressure sensor 8, an electrical temperature sensor 7, a digital evaluation circuit 12, an electric battery 9, a program switch actuable from the exterior, and a display 10 as well as apertures 2 for the pressure sensor 8 and the aperture for the temperature sensor 7. The electric, electronic and mechanical structural units or components are electrically interconnected in a conventional manner in such a way that measured values from the pressure sensor 8 and from the temperature sensor 7 may be processed and stored by the digital evaluation circuit 12. Different stored measured values processed by the evaluation circuit 12 may be called up by the externally actuable program switch 11 from the measuring data storage, and rendered visible in the display 10.

On top of the housing 1 there is provided an eyelet 13 for affixing a plumb line.

For use, the depth gauge is affixed to a fishing or plumb line by the eyelet 13, activated by the program switch 11, and sunk into the water. The values measured by the pressure and temperature sensors 7; 8 are processed by the digital evaluation circuit 12 and the depth at which a temperature discontinuity of more then 3° Kelvin occurs is particularly registered and stored.

When retrieving the depth gauge measurement data of the deepest measuring point of the water are no longer registered and stored. The measurement data processed and stored by the digital evaluation circuit 12, in particular the discontinuity in temperature at a measured depth, can now be called up from the data storage by the program switch 11 and rendered visible in the display 10, when the depth gauge has been retrieved from the water.

On the basis of this data, the angler may now place his species-specific bait for fish assumed at or in the thermocline and thus influence his chances of success in a positive manner.

I claim:

1. An apparatus for measuring the vertical extent and the temperature of at least a portion of a body of water, comprising:

first and second means for forming a housing;

means for releasably connecting the first and second means for forming a cavity within said housing;

means in at least one of the first and second housing forming means for measuring the pressure of the body of water as a function of the vertical extent and for deriving a first signal representative thereof;

means in the one housing forming means connected to the pressure measuring means for storing the first signal;

means in the one housing forming means for measuring the temperature of the body of water at least within the vertical extent and for deriving a second signal representative thereof;

means in the one housing forming means connected to the temperature measuring means for storing the second signal;

means in the one housing forming means for processing the first and second signals;

means in the one housing forming means for selectively rendering the processed signals perceptible as values representative of the vertical extent and of the temperature;

means in the other of the first and second housing forming means for receiving means for varying the weight of the depth gauge; and means mounted on at least one of the first and second housing forming means adapted to be connected to means for retrieving the apparatus from the body of water.

2. The apparatus of claim 1, wherein said water pressure measuring means is exposed to ambient water by means forming at least one aperture in said one housing forming means.

3. The apparatus of claim 1, wherein said temperature measuring means measures predetermined temperature differences over a predetermined vertical distance.

4. The apparatus of claim 3, wherein said water temperature measuring means measures temperature differences of at least 30° K.

5. The apparatus of claim 1, wherein said means for rendering said signal perceptible comprises alph-anumeric indicator means.

6. The apparatus of claim 5, wherein the alpha-numeric indicator means is provided with program switch means for selectively rendering values of the vertical extent and of the temperature visible and for resetting the values to predetermined values.

7. The apparatus of claim 1, further comprising battery means in the one housing forming means and electrically connected to the first and second signal deriving means, the storing means, the rendering means, the resetting means and the signal processing means.

8. The apparatus of claim 1, wherein the receiving means comprises a fishing line.

9. The apparatus of claim 1, wherein said first and second housing forming means are threadedly connectable to each other.

10. The apparatus of claim 1, wherein the means for measuring the temperature of the water is responsive to temperature changes of about 30°.

* * * * *